3,379,668
POLYURETHANE COMPOSITIONS HAVING IMPROVED LOW-TEMPERATURE PROPERTIES AND INCREASED SOFTNESS

Edward J. Lui, Lorain, and Frederick L. Pittenger, Rocky River, Ohio, assignors to The B. F. Goodrich Company, New York, N.Y., a corporation of New York
No Drawing. Filed Mar. 25, 1965, Ser. No. 442,777
12 Claims. (Cl. 260—31.4)

ABSTRACT OF THE DISCLOSURE

Polyurethane elastomers having improved softness are prepared by mixing thermoplastic substantially uncrosslinked polyesterurethanes and polyetherurethanes with minor proportions of diesters of triethylene glycol and saturated aliphatic monocarboxylic acids containing 8 to 10 carbon atoms.

---

This invention relates to polyurethane elastomer compositions which have improved softness and better properties at low temperatures. More particularly, this invention concerns a mixture comprising a thermoplastic, substantially uncrosslinked polyesterurethane or polyetherurethane and a critical portion of a diester derived from triethylene glycol and an aliphatic, saturated, monocarboxylic acid having 8 to 10 carbon atoms.

U.S. Patent No. 2,871,218, copending U.S. Application Ser. No. 294,933 of Robert M. Carvey and Edmond G. Kolycheck, filed July 15, 1963, now abandoned and copending U.S. Application Ser. No. 375,657 of Robert M. Carvey and Donald E. Witenhafer now abandoned describe thermoplastic polyesterurethane elastomers which are substantially free of crosslinked structures. These polyesterurethanes comprise the reaction product of a mixture of a hydroxyl terminated linear polyester, an aromatic diisocyanate, and an aliphatic glycol, said reaction product being essentially free of any unreacted isocyanate or hydroxyl groups. U.S. Patent No. 2,899,411 describes thermoplastic, substantially uncrosslinked polyetherurethane elastomers which comprise the reaction product of a hydroxyl poly(polymethylene oxide), an aliphatic glycol, and an aromatic diisocyanate. The aforesaid polyurethane materials, available under the trademark "Estane" and are thermoplastic, extrudable, moldable, abrasion resistant, tough, rather hard elastomers. These elastomers are useful in the fabrication of seals, gaskets, bearings, shoe heels, solid tires, and sheets for the production of gasoline tanks and other vessels. However, the shortcomings of the elastomers lie in their relative hardness and inflexibility, especially at low temperatures. It is, therefore, the object of the present invention to improve the said deficiencies of the polyurethane elastomers without significantly detracting from their good properties such as outstanding abrasion resistance and high tensile strength. This object is accomplished by blending with the elastomer a critical amount of certain liquid plasticizers derived from triethylene glycol.

The compositions of this invention comprise a mixture of (L) 100 parts by weight of a thermoplastic polyurethane elastomer selected from the group consisting of:
(A) a polyesterurethane comprising the reaction product of the essential ingredients:
  (a) one mol of an essentially linear, hydroxyl terminated polyester of (i) a saturated, aliphatic glycol having from 2 to 10 carbon atoms and the hydroxyl groups on the terminal carbon atoms and (ii) a dicarboxylic acid of the formula

HOOC—R—COOH where R is an alkylene radical having 2 to 8 carbon atoms, or the anhydride of said dibasic acid, said polyester having an average molecular weight from about 600 to about 2,000 and an acid number of less than 10,
  (b) from about 1.3 to 3.0 mols of aromatic diisocyanate, and
  (c) from about 0.3 to 2.0 mols of saturated, aliphatic, free glycol (i.e., alkylene glycol) having from 2 to 6 carbon atoms and having the hydroxyl groups on the terminal carbon atoms, the molar amount of (a) and (c) combined being essentially equivalent to the molar amount of (b), such that there is essentially a stoichiometric equivalency of hydroxyl and isocyanate groups in the recipe and, ultimately, essentially no unreacted glycol or unreacted diisocyanate in the said reaction product; and
(B) A polyetherurethane comprising the reaction product of the essential ingredients:
  (1) one mol of a hydroxyl poly(polymethylene oxide) of the formula $HO[(CH_2)_nO]_xH$ wherein $n$ is a number from 3 to 6 and $x$ is an integer greater than 7, and the molecular weight is from 500 to about 4,000,
  (2) from about 1.5 to 3.0 mols of aromatic diisocyanate, and
  (3) from about 0.5 mol to 2.0 mols of an alkylene gylcol having from 2 to 6 carbon atoms and the hydroxyl groups on the terminal carbon atoms, the molar amount of (1) and (3) combined being essentially equivalent to the molar amount of (2); and (II) a diester of triethylene glycol and an aliphatic, saturated, monocarboxylic acid having 8 to 10 carbon atoms, wherein the amount of the diester combined with polyesterurethane (A) is from one to ten parts by weight and the amount of the diester combined with polyetherurethane (B) is from one to 35 parts by weight.

The basic polyester reactant embodied in the polyester urethane elastomer is essentially linear and is hydroxyl terminated. It is the condensation product obtained by an esterification of an aliphatic dicarboxylic acid or an anhydride thereof with a straight chain glycol containing 2 to 10 carbon atoms and having its hydroxyl groups on the terminal carbon atoms, for example ethylene glycol, 1,2-propanediol, 1,4-butanediol, 1,5-pentanediol, 1,6-hexanediol, and the like and mixtures thereof. Examples of the aliphatic, dibasic, carboxylic acids utilized in preparing the polyester are adipic, succinic, pimelic, suberic, azelaic, sebacic and the like, or their anhydrides. In the preparation of the polyesters, molar ratios of more than one mol of glycol per mol of acid are preferred so as to obtain essentially linear chains containing a preponderance of terminal hydroxyl groups. The methods and details of producing such polyesters are well known. The polyester suitable as a component of the polyesterurethane elastomer embodied in this invention is characterized by having an average molecular weight of from about 600 to about 2,000, a hydroxyl number of from about 50 to 180 and an acid number of less than 10, preferably less than 7. The quality of the polyesterurethane product increases as the acid number of the polyester decreases. An acid number of less than about 4.0 is thus more preferred, and an acid number of less than 2.0 is most desirable.

As previously stated, the basic polyether reactant embodied in the polyetherurethane elastomer has the formula $HO[(CH_2)_nO]_xH$ wherein $n$ is a number of from 3 to 6 and $x$ is an integer greater than 7 such that the molecular weight is from about 500 to about 4,000. Preferred is hydroxyl poly(tetramethylene oxide) having a molecular weight of from about 900 to 3,000. The preferred polyetherurethanes are comprised of one mol of the hydroxyl poly(tetramethylene oxide), from 1.0 to 2.0 mols of an alkylene glycol having 2 to 6 carbon atoms, and 2.0 to 3.0 mols of a diphenyl diisocyanate, the molar amount of the hydroxyl poly(tetramethylene oxide) and alkylene glycol combined being essentially equivalent to the molar amount of diphenyl diisocyanate.

The free alkylene glycol reactant embodied in the polyurethane elastomer, i.e., the chain extender in the polymer structure, is a linear, saturated diol having 2 to 6 carbon atoms and the hydroxyl groups on the terminal carbon atoms, ethylene glycol and 1,4-butanediol being preferred.

The aromatic diisocyanate constituent of the polyurethane is exemplified by such compounds as aromatic diisocyanates containing at least one phenyl group, and preferably diphenyl diisocyanates having an isocyanate group and preferably diphenyl diisocyanates having an isocyanate group on each phenyl nucleus. Representative diisocyanates include para-phenylene diisocyanate, metaphenylene diisocyanate, naphthalene-1,5-diisocyanate, tetrachloro m-phenylene diisocyanate, durene diisocyanate, 2,4-toluene diisocyanate and 2,6-toluene diisocyanate and mixtures thereof, and the like, 4,4-diphenyl diisocyanate, the dichloro-diphenyl methane diisocyanates, bibenzyl diisocyanate, bitolylene diisocyanate, the diphenyl ether diisocyanates, the dimethyl diphenyl methane diisocyanates, and preferably the diphenyl methane diisocyanates represented by the formula

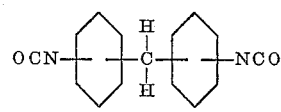

especially diphenyl methane-p,p'-diisocyanate having the formula

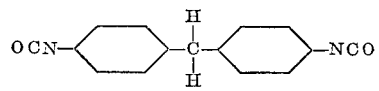

A convenient method for preparing the elastomers embodied herein is to react a mixture of the polyester (or polyether) and glycol with the aromatic diisocyanate at a temperature within the range of about 120° C. to about 250° C. for a period of time sufficient to insure essentially complete stoichiometric utilization of the reactants according to their molar equivalences as charged. The polymerizations should be carried out under essentially anhydrous conditions with dry reactants, that is, the reaction mixture is substantially free of water which would react with isocyanate groups to form undesirable by-products. As a practical matter, there should be less than about 0.1% and preferably less than 0.05% of water present in the reaction mixtures. Essentially anhydrous conditions can be assured by simply heating the polyester or polyether and glycol at low pressure before mixing with the anhydrous diisocyanate. The resulting polyurethane elastomers are thermoplastics having melt-flow temperatures within the range of about 90° C. to about 180° C. The melt-flow temperature of a plastic is the minimum temperature at which the material can be "worked," i.e., milled, calendered, extruded, molded, etc.

The compositions of this invention are conveniently prepared by blending the polyurethane and the triethylene glycol diester at a temperature of from about 100° C. to 185° C., depending upon the characteristics of the particular elastomer being modified, using conventional plastics or rubber compounding equipment, such as Banbury mixers and roll-mills.

The plasticizer mixed with the polyurethane according to this invention is the diester of a saturated monobasic acid having 8 to 10 carbon atoms with triethylene glycol, for example, triethylene glycol dicaprylate, triethylene glycol di-2-ethylhexoate, triethylene glycol caprylate-caprate (mixed $C_8$–$C_{10}$ esters) and triethylene glycol dipelargonate.

The amount of plasticizer mixed with the polyurethane is of critical proportions. At least about one part by weight of diester per 100 parts by weight of elastomer is required to give some improvement in hardness and flexibility properties. Ten parts per hundred of plasticizer is the maximum amount useful for modifying the polyesterurethane elastomer. Slightly larger amounts will result in exudation or "sweating" of the diester from the surface of the mixture. Still larger amounts will not completely blend into the polyurethane during mixing resulting in the formation of incompatible slippery mixtures which are not susceptible to milling, i.e., the plastic will not flux on the roll mills. The upper limit of plasticizer in the polyetherurethane mixture is 35 parts per 100 parts of the urethane elastomer. The use of larger amounts resulting in mixtures which cannot be fluxed in a mixer or on a mill.

The following examples are presented to clarify the invention and to illustrate why the amount of triethylene glycol diester plasticizer is critical. In the examples, in which the diester is triethylene glycol dipelargonate, the polyurethane and diester were mixed in a Banbury mixer and a two-roll mill at a stock temperature of about 150° C. to 180° C., and then representative samples were compression molded at 175° C. into 6″ x 6″ x 0.075″ sheets for physical testing in accordance with the following procedures:

Ultimate tensile strength, p.s.i., ultimate elongation in percent (i.e., at break), and modulus in p.s.i. (i.e., tensile stress): ASTM Test Method D412–51T.

Hardness in Duro A units was determined using a durometer as per ASTM Test Method D676–59T.

Abrasion loss in milligrams using Taber abraser at 1,000 revolutions: ASTM D1044–56.

Graves tear strength in lbs./inch: ASTM D1004–59T.

Clash-Berg temperature ($T_f$) in ° C. at 45,000 p.s.i. modulus: ASTM D1043–51. The Clash-Berg test is used for determining the stiffness characteristics of non-rigid plastics and rubbers. At a given modulus, the flexibility is measured by the $T_f$ temperature; the lower this temperature, then the more flexible is the plastic.

"Exudation" test measures the amount of plasticizer lost from the polyurethane composition by migration to the surface. It is measured quantitatively by holding 1″ x 1″ x 0.075″ samples at 70° C., for four hours, wiping dry and recording any weight loss, or it is measured qualitatively by holding samples 2″ x ½″ x 0.075″, which are bent double, at 82° C. for four hours and looking at the surface for exuded plasticizer.

EXAMPLE 1

In this example the elastomer was a polyesterurethane produced by the reaction of one mol of hydroxyl poly(tetramethylene adipate) having a molecular weight of about 1,000 and an acid number of 2.0, one mol of 1,4-butanediol and two mols of diphenyl methane-p,p'-diisocyanate (known in the trade as MDI). The data are set forth in the following table. The amounts of materials are in parts by weight:

|  | Experiment No. | | | |
| --- | --- | --- | --- | --- |
|  | 1 (Control) | 2 | 3 | 4 |
| Polyesterurethane, parts | 100 | 100 | 100 | 100 |
| Triethylene glycol diester, parts | 0 | 10 | 12.5 | 15 |
| Physical Properties: |  |  |  |  |
| Tensile Strength | 5,800 | 5,400 | 5,000 | (¹) |
| 300% modulus | 1,400 | 900 | 800 | |
| Elongation | 500 | 660 | 710 | |
| Hardness | 88 | 85 | 82 | |
| Graves Tear | 400 | 415 | 372 | |
| Exudation |  | No | Yes | |

¹ Mixture of elastomer and plasticizer would not flux in Banbury mixer.

The above data show that the level of plasticizer in the polyesterurethane compositions should not exceed about 10 parts per hundred of the elastomer.

EXAMPLE 2

The polyesterurethane elastomer used in this example was the product of one mol of the hydroxyl poly(tetramethylene adipate) described in Example 1, one mol of ethylene glycol and two mols of MDI. The data are summarized below.

|  | Experiment No. | | | | |
| --- | --- | --- | --- | --- | --- |
|  | 5 (Control) | 6 | 7 | 8 | 9 |
| Polyesterurethane, parts | 100 | 100 | 100 | 100 | 100 |
| Triethylene glycol diester, parts | 0 | 10 | 15 | 20 | 25 |
| Physical Properties: | | | | | |
| Tensile Strength | 6,800 | 6,240 | | | |
| 300% Modulus | 1,220 | 880 | | | |
| Elongation | 5,400 | 630 | The mixture would not flux in the Banbury mixer. | | |
| Hardness | 78 | 68 | | | |
| Abrasion loss | 33 | 27 | | | |
| Graves Tear | 388 | 352 | | | |
| Exudation | | No | | | |
| Clash-Berg Temp., $T_f$ | −27 | −40 | | | |

The results illustrate that improved low-temperature flexibility and decreased hardness may be achieved at levels up to 10 parts per hundred parts of polyesterurethane.

EXAMPLE 3

This example illustrates the modification of a polyetherurethane comprising the reaction product of one mol of hydroxyl poly(polymethylene oxide) having a molecular weight of about 1,000, one mol of 1,4-butanediol and 2 mols of MDI. The data set forth in Table A show the operable range of plasticizer to be 5 to 30 parts per 100 parts of the polyetherurethane.

(c) from about 0.3 to 2.0 mols of a saturated, aliphatic glycol having from 2 to 6 carbon atoms and the hydroxyl groups on the terminal carbon atoms, the molar amount of (a) and (c) combined being essentially equivalent to the molar amount of (b), and (B) from one to ten parts by weight of a diester of triethylene glycol and an aliphatic, saturated, monocarboxylic acid having 8 to 10 carbon atoms.

2. The composition according to claim 1 wherein the diester is triethylene glycol dipelargonate.

3. The composition according to claim 1 wherein the aromatic diisocyanate is a diphenyl diisocyanate having an isocyanate group on each phenyl nucleus.

4. The composition according to claim 3 wherein the diester is triethylene glycol dipelargonate.

5. The composition according to claim 1 wherein the aromatic diisocyanate is diphenyl methane - p,p′-diisocyanate.

6. The composition according to claim 5 wherein the diester is triethylene glycol dipelargonate.

7. A composition comprising the mixture of:
(A) 100 parts by weight of a thermoplastic polyetherurethane elastomer comprising the reaction product of the essential ingredients:
  (a) one mol of a hydroxyl poly(polymethylene oxide) of the formula $$HO[(CH_2)_nO]_xH$$

wherein $n$ is a number from 3 to 6 and $x$ is integer greater than 7, and the molecular weight is from about 500 to about 4,000,
  (b) from about 1.5 to 3.0 mols of an aromatic diisocyanate, and

TABLE A

|  | Experiment No. | | | | | | | |
| --- | --- | --- | --- | --- | --- | --- | --- | --- |
|  | 10 (Control) | 11 | 12 | 13 | 14 | 15 | 16 | 17 |
| Polyetherurethane, parts | 100 | 100 | 100 | 100 | 100 | 100 | 100 | 100 |
| Triethylene glycol diester, parts | 0 | 5 | 10 | 15 | 20 | 30 | 40 | 50 |
| Physical Properties: | | | | | | | | |
| Tensile Strength | 5,000 | 4,450 | 3,900 | 3,300 | 3,650 | 2,700 | Mixtures would not flux in Banbury Mixer | |
| 300% Modulus | 1,000 | 900 | 850 | 750 | 750 | 600 | | |
| Elongation | 620 | 770 | 760 | 800 | 810 | 920 | | |
| Hardness | 82 | 80 | 76 | 79 | 78 | 74 | | |
| Abrasion Loss | 38 | 50 | 48 | 59 | 56 | 102 | | |
| Clash-Berg Temp., $T_f$ | −57 | −64 | −67 | N.M. | −73 | N.M. | | |
| Exudation | | No | No | No | No | No | | |

N.M.—means not measured.

The compositions of this invention may also have incorporated therein small amounts, e.g., from about 0.1 to 20 parts per hundred parts by weight of the polyurethane, of well known elastomer modifiers to serve as mechanical processing aids, for example, inert fillers such as silica, and lubricants such as calcium stearate.

We claim:
1. A composition comprising the mixture of:
(A) 100 parts by weight of a thermoplastic polyesterurethane elastomer comprising the reaction product of the essential ingredients:
  (a) one mol of an essentially linear, hydroxyl terminated polyester of (i) a saturated, aliphatic glycol having from 2 to 10 carbon atoms and the hydroxyl groups on the terminal carbon atoms, and (ii) a compound selected from the group consisting of dicarboxylic acids of the formula HOOC—R—COOH where R is an alkylene radical having 2 to 8 carbon atoms, or the anhydrides of said acids, said polyester having an average molecular weight of from about 600 to about 2,000 and an acid number of less than 10,
  (b) from about 1.3 to 3.0 mols of an aromatic diisocyanate, and

(c) from about 0.5 to 2.0 mols of a saturated, aliphatic glycol having from 2 to 6 carbon atoms and the hydroxyl groups on the terminal carbon atoms, the molar amount of (a) and (c) combined being essentially equivalent to the molar amount of (b), and (B) from one to 35 parts by weight of diester of triethylene glycol and an aliphatic, saturated, monocarboxylic acid having 8 to 10 carbon atoms.

8. The composition according to claim 7 wherein the diester is triethylene glycol dipelargonate.

9. A composition comprising the mixture of:
(A) 100 parts by weight of a thermoplastic ployetherurethane elastomer comprising the reaction product of the essential ingredients:
  (a) one mol of hydroxyl poly(tetramethylene oxide) having a molecular weight of from about 900 to 3,000,
  (b) from about 2.0 to 3.0 mols of a diphenyl diisocyanate having an isocyanate group on each phenyl nucleus, and
  (c) from about 1.0 to 2.0 mols of a saturated, aliphatic glycol having from 2 to 6 carbon atoms and the hydroxyl groups on the terminal carbon atoms, the molar amount of (a) and (c)

combined being essentially equivalent to the molar amount of (b), and (B) from one to 35 parts by weight of a diester of triethylene glycol and an aliphatic, saturated, monocarboxylic acid having 8 to 10 carbon atoms.

10. The composition according to claim 9 wherein the diester is triethylene glycol dipelargonate.

11. The combination according to claim 9 wherein the diisocyanate is diphenyl methane-p,p'-diisocyanate.

12. The composition according to claim 11 wherein the diester is triethylene glycol dipelargonate.

References Cited

UNITED STATES PATENTS

| | | | |
|---|---|---|---|
| 2,871,218 | 1/1959 | Schollenberger | 260—75 |
| 2,871,248 | 1/1959 | Kirkland et al. | 260—31.4 |
| 2,899,411 | 8/1959 | Schollenberger | 260—77.5 |
| 3,001,971 | 9/1961 | Scott et al. | 260—75 |
| 3,015,570 | 1/1962 | Bowman et al. | 260—31.4 |
| 3,032,519 | 5/1962 | Batts | 260—31.4 |

DONALD E. CZAJA, *Primary Examiner.*

R. W. GRIFFIN, *Assistant Examiner.*